United States Patent [19]

Voisard

[11] Patent Number: 4,648,798

[45] Date of Patent: Mar. 10, 1987

[54] CONTROLLABLE PITCH AIRCRAFT PROPELLER

[75] Inventor: Walter B. Voisard, Beavercreek, Ohio

[73] Assignee: The Cessna Aircraft Company, Wichita, Kans.

[21] Appl. No.: 729,438

[22] Filed: May 1, 1985

[51] Int. Cl.⁴ .................................................. B64C 11/38
[52] U.S. Cl. .................................... 416/48; 416/46; 416/154
[58] Field of Search ............... 416/49, 50, 46, 48, 416/47, 153, 154

[56] References Cited

U.S. PATENT DOCUMENTS

| | | | |
|---|---|---|---|
| 2,916,094 | 12/1959 | Berninger et al. | 416/50 |
| 2,959,156 | 11/1960 | Dreptin | 416/49 X |
| 2,986,222 | 5/1961 | Biermann | 416/50 X |
| 3,057,140 | 10/1962 | Biermann | 416/48 |
| 3,167,131 | 1/1965 | Voisard | 416/46 X |
| 3,207,227 | 9/1965 | Timewell | 416/46 |
| 3,249,159 | 5/1966 | Biermann | 416/50 X |
| 3,261,405 | 7/1966 | Andrews | 416/27 |
| 3,380,535 | 4/1968 | Biermann | 416/46 |
| 3,389,641 | 6/1968 | Barnes | 416/157 R X |
| 3,446,289 | 5/1969 | Morris, Jr. | 416/50 |
| 3,575,529 | 4/1971 | Bierman | 416/48 X |
| 4,097,189 | 6/1978 | Harlamert | 416/48 X |
| 4,202,655 | 5/1980 | Maloof | 416/157 R X |

*Primary Examiner*—Everette A. Powell, Jr.
*Attorney, Agent, or Firm*—Biebel, French & Nauman

[57] ABSTRACT

A variable pitch propeller, particularly suited for use with turbine engines, includes a range of beta control in low pitch and reverse pitch positions, in which the pilot can obtain a ground angle range with substantially lower angles in relation to the flight idle position. This is accomplished by the provision of lost motion connections in the form of sliding sleeves mounted on the beta feedback rods which come into operation at a particularly defined low pitch angle, under control of the pilot, and permits the blades to move to a still lower pitch angle for ground operations, by providing for relative movement between the blade yoke and the beta feedback rods.

7 Claims, 12 Drawing Figures

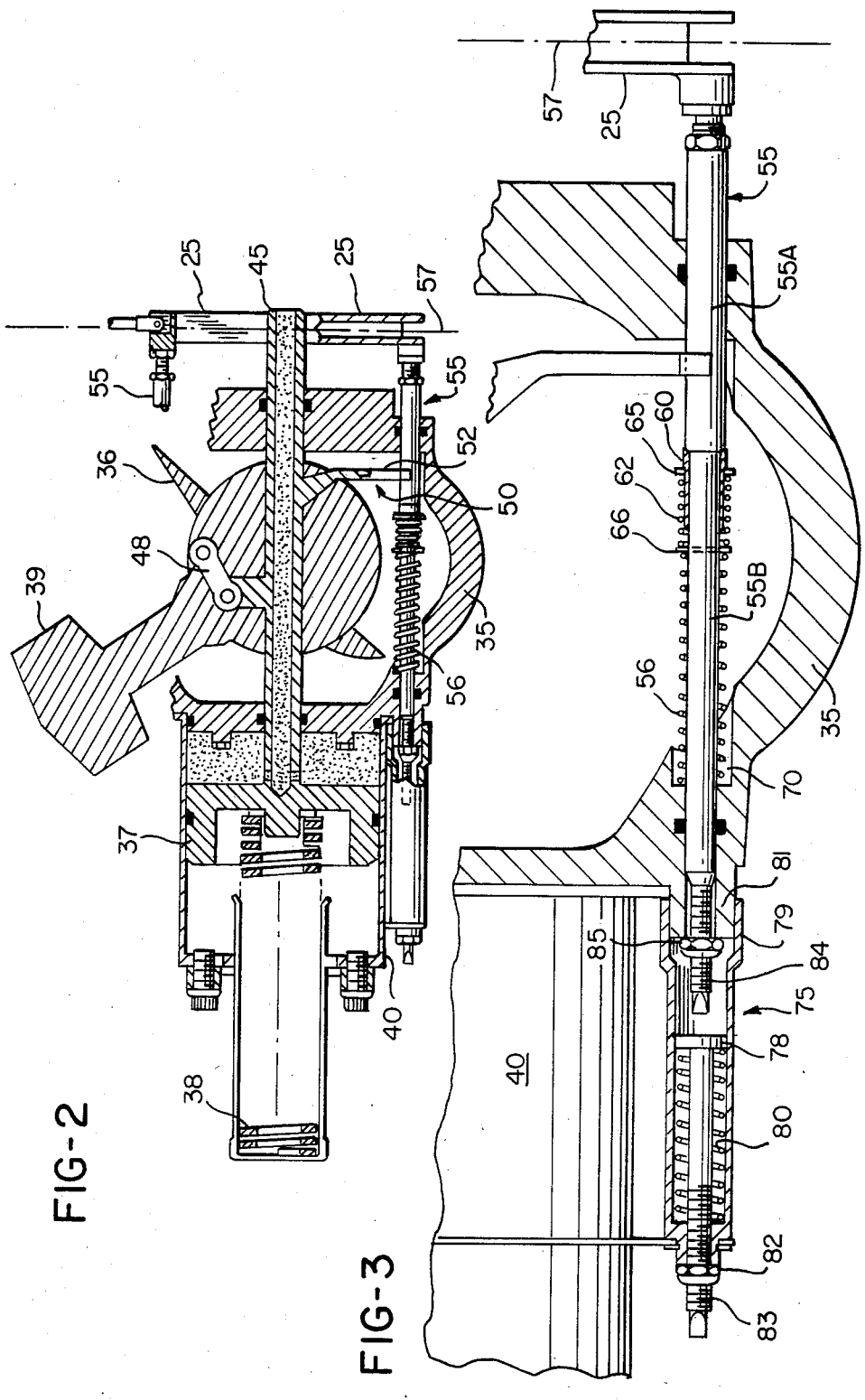

CONTROLLABLE PITCH AIRCRAFT PROPELLER

BACKGROUND OF THE INVENTION

This invention relates to controllable pitch aircraft propellers and more particularly to such propellers which are adapted to be operated with free turbine engines having a beta pitch control mechanism, such as the Pratt & Whitney PT 6A engine series, for example. More particularly, the invention relates to reversible pitch turbo-propeller which is capable of automatically providing a blade shift to a lower pitch angle, upon command of the pilot during ground operations, for the purpose of maintaining the rpm of the turbine and the thrust of the propeller within acceptable limits and for assuring that the propeller does not operate in the reactionless mode.

The propeller control system to which the present invention is applied is basically the system as shown in U.S. Pat. No. 3,249,159 issued May 3, 1966 to Biermann and U.S. Pat. No. 3,446,289 issued May 27, 1969 to Morris, Jr., in which the blade position is transmitted to a valve (a beta valve) through a mechanical feedback arrangement carried on the propeller. While the control system illustrated herein is applied to an external feedback propeller, of the general type shown in Biermann U.S. Pat. No. 3,249,159 as noted above, it should be understood that the invention is not limited to this particular concept and may be applied, for example, to a propeller with internal feedback to a beta rod such as shown in Biermann U.S. Pat. No. 2,986,222 issued May 30, 1961 or Biermann U.S. Pat. No. 3,380,535, issued Apr. 30, 1968.

During the approach conditions, if the pilot selects an approach or flight idle position, such as during flare out and touchdown, the propeller blades are normally maintained by the system at a minimum positive blade angle. This angle has been selected to provide relatively low thrust or drag, taking into account the approach speed of the aircraft, and the minimum gas generator speed required to sustain the operation of the gas turbine. However, once the aircraft has landed and its landing speed has been largely dissipated, the propeller blade angle is often high enough to cause the propeller rotation speed to be lowered into the speed range of a reactionless mode. This reduction in propeller rpm during taxi operation is due to the nature of the free turbine engine in that the propeller and free power turbine speed is a function of blade angle and gas generator speed. However, it is not practical to permit the propeller speed to drop below a minimum level at which a reactionless mode may be encountered.

The term "reactionless mode" describes a resonance vibration condition which can affect propellers having four or more blades, during ground operation. Generally, the reactionless mode condition is more likely to occur during ground operations in crosswinds or in quartering tailwinds, and during times that the propeller speed has dropped into a critical range. Each propeller design having four or more blades is characterized by known or predictable conditions at which the reactionless mode may be encountered. Since the reactionless mode results in high blade and hub stresses, without producing any net load to the engine flange, it is a condition to be avoided whenever possible. One way of avoiding this condition is to provide a system which is capable of decreasing the blade angle, at or following landing or rollout, either automatically or at the command of the pilot, to a point where the blade will continue to be driven by the turbine at an rpm safely above that range in which the reactionless mode may occur. For example, a propeller may be physically designed to encounter reactionless mode conditions in the range of 700 to 1,000 rpm, and the control system may be designed to provide a power setting and/or blade setting which assures that the propeller speed does not fall below 1,050 rpm during ground operations. However, simply adding fuel to the turbine to maintain such propeller speeds, without further descreasing the blade angle from the minimum approach configuration, commonly results in substantial excess thrust, thereby causing problems for the pilot in taxiing and the like.

In an initial attempt to deal with this condition, aircraft engine manufacturers have added a selectable position to the power levers, namely that of ground idle. The control quadrant is provided with a stop or gate arrangement which normally intercepts the power levers at the flight idle minimum position. However, the pilot has the means of moving the power levers in such a way as to bypass this stop or gate into a ground idle range, usually by grasping and lifting the levers over the gate. During this movement, a mechanical cam is brought into operation which physically moves the beta valve in such a direction as to cause the propellers to decrease pitch by a small amount, such as about 4°. At the same time, a connection is made by the cam to the fuel control arm of the turbine fuel control unit which may cause the fuel control unit on the engine to deliver the specified amount of turbine fuel to the engine to assure that it maintains its minimum operating speed during ground operations.

Airframe or propeller manufacturers have found that the propeller idle cam arrangement does not by itself move the beta valve sufficiently to cause a sufficient decrease in blade angle. This is due to the fact that the amount of movement available between flight idle and ground idle positions, the amount of cam surface available, and the forces required to move the cam physically restrict the same to about a maximum of 8° movement of pitch angle. Accordingly, both engine and airframe manufacturers have devised additional arrangements for imparting further blade movement to lower pitch settings following landing.

One arrangement which has come into relatively wide use is that employed by the Beech Aircraft Company in its King Air models, consisting of a squat-switch operated electric solenoid. The switch may be directly operated oy the pilot or it may be indirectly operated by sensing a power lever position in the ground idle range or it may be automatically operated by means of a connection to the landing gear and be operated when the landing gear has contacted the ground and sufficient weight has been transferred to the wheels. In any case, a squat-switch actuates an electric solenoid coupled to the beta valve and effects a predetermined additional shift to this valve, independent of the movement of the power levers into the ground idle range, causing the propeller blades to move to a lower and acceptable pitch angle for ground operation, as compared to the higher approach angle.

An additional system has been designed by Pratt & Whitney which is pneumatically operated oy bleed air from the compressor, to operate a pneumatic piston which, like the Beech system, is mechanically connected to reopen and move the beta valve through a finite distance. The application of bleed air to the piston is again either controlled or operated by a squat-switch on the landing gear or operated by a pilot command switch.

In either the Beech or the Pratt & Whitney systems, the means by which the blade angle is reduced consists of an external actuator which is connected to move the beta valve thus reopen the same to cause additional movement of the propeller pitch changing mechanism to a lower pitch angle until the movement is transferred back by the pitch change mechanical feedback mechanism to the beta valve, at which point the valve is reclosed. In both systems, the blade angle is reduced to raise propeller speed out of the range of reactionless mode while leaving the gas generator at its minimum sustaining power level or speed, as outlined above.

Since the existing systems are operated generally external to the propeller, and require a separate source of power for operation, such as bleed air and/or electric power, there exists a need for a completely self-contained beta shift mechanism operated within the propeller pitch change mechanism itself.

SUMMARY OF THE INVENTION

As previously noted, the invention is directed to a controllable pitch propeller or propeller system, which may be a reversible pitch system, which incorporates a blade angle change mechanism known as a beta control, and in which the pitch angle position of the propeller may be placed under the direct control of the pilot through a mechanical feedback arrangement to the beta valve. The improvement consists of a mechanical arrangement on the propeller through which lower pitch angles may be available for ground operation, to maintain the propeller rpm at a desirable minimum speed. The mechanism provides smooth transition to such lower pitch angles when power lever is moved by the pilot into the range of ground idle position. Concurrently with the shifting to the lower blade angle, the lower idle $N_g$ fuel setting may be selected, to prevent the propeller speed from going much above a desired minimum established for ground operation.

Conventionally, the propeller mechanism itself is provided with mechanical feedback in the form of rods or the like, through which the blade angle position is fed back to the beta valve. The invention includes an arrangement by means of which the blades, under the influence of the hydraulic piston, are permitted to move through an additional change in blade angle without effecting a corresponding change in position of the feedback rods. This is accomplished in the preferred embodiments by one or more spring biased movable stops in the form of sliding collars or the like, which permits the blade yoke which couples the beta feedback rods to the propeller blades, to shift through a certain and predetermined distance, corresponding to a predetermined decrease in pitch angle, without effecting corresponding movement of the rods, and thereafter to pick up the movement of the rods for lower pitch positions, or negative pitch positions such as during reverse thrust operations.

The apparatus forms a movable spring loaded connection in association with the propeller beta feedback rods which provides for movement of the blades automatically to a lower pitch position upon a minimum higher pitch position. The spring-loaded connections thereafter picks up the beta feedback rods after the blades have moved through a predetermined angle.

Thus, the pilot may select a flight idle position of, for example 17°, in the beta control range of the system. Upon landing, the pilot may then select a ground idle position by movement of his power levers out of a gate to a more rearward position. This operates to move the beta valve sufficiently so that the blade yoke picks up or engages the movable stop or sleeve arrangements on the beta rod. The movable sleeves permit the yoke to move through a predetermined extent, corresponding to a further decrease in pitch of from 5°–8° for example, without effecting further movement of the beta feedback rods. Thereafter, the beta feedback rods are again picked up and are caused to follow the position of the blades. The latter action causes the beta valve to close as a hydraulic low pitch stop. The pilot may also select a reverse thrust position, conventionally, if desired.

More broadly, the movable spring-loaded connections may be considered lost motion connections which come into operation only upon the propeller blades arriving at a particular minimum pitch condition, under control of the beta valve, which connections temporarily interrupt the mechanical feedback to the beta valve, so that the blades continue to be moved through a finite angle until the feedback mechanism is again picked up by the blade yoke. The extent of movement may be determined by controlling the amount of free movement of the blade yokes with respect to the position feedback mechanism, such as by controlling the length of movable sleeves between spaced fixed stop members, and the position at which this automatic shifting of the blades to a lower pitch position occurs may be controlled by suitably positioning the movable stops in relation to the blade yoke and in relation to the flight idle position. In accordance with this invention, the lost motion connection will not come into operation at blade angles at or above the flignt idle position and not until specifically selected by the pilot.

Two embodiments of the invention are shown and described. A first embodiment incorporates a portion of the stop mechanism located exteriorly of the propeller hub while a second embodiment incorporates the entire mechanism within the interior of the propeller hub.

It is accordingly an important object of this invention to provide apparatus, associated with the propeller itself, by means of which lower blade angles may be automatically selected for ground operation.

A still further object is the provision of a propeller, particularly adapted or suited for use with turbine engines, which includes blade angle shift mechanisms operable upon the pilot selecting a ground idle position with his power levers, to bring the blades into nearly flat or desired low pitch position, to maintain minimum blade rpm.

A still further object of the invention is the provision of a propeller system, as outlined above, which automatically selects lower blade angles for ground operation conditions, employing a selectively movable stop mechanism on the propeller for temporarily interrupting the movement of the beta feedback rods.

A further object of the invention is the provision of a propeller mechanism with a movable low pitch position stop mechanism which permits the blades to be carried to lower pitch angle positions during ground idle operations.

These and other objects and advantages of the invention will be apparent from the following description, the accompanying drawings, and the appended claims.

BRIEF DESCRIPTION OF THE DRAWINGS

FIG. 2 is a schematic sectional view through the propeller hub, illustrating the principles of operation of the propeller with the parts being shown in a typical flight position under governor control;

FIGS. 3 through 7 are enlarged fragmentary sections through the propeller hub showing one of the beta feedback rods with the position of the propeller blade shown;

FIG. 3 shows the position of the parts in a typical governing flight configuration;

FIG. 4 shows the movement of the propeller blade yoke into initiation of the beta feedback position;

FIG. 5 shows the movement of the yoke and beta feedback rod to the flight idle range;

FIG. 6 shows the initial movement of the blade yoke and beta feedback rod to a ground idle range;

FIG. 7 shows the completed movement of the sleeve on the beta feedback rod permitting movement of the blade yokes to a full ground idle range;

FIG. 8 shows the position of the parts under governor control;

FIG. 9 is similar to FIG. 4, and shows the movement of the propeller blade yoke at the initiation of beta control;

FIG. 10 shows the position of the parts in the flight idle range, similar to the position of the parts in FIG. 5;

FIG. 11 shows the further movement of the parts to the ground idle range, similar to the position shown in FIG. 7 for the first embodiment; and FIG. 12 shows the position of the parts during further movement, such as to a reverse thrust position, as for example shown in broken line form in FIG. 7.

DESCRIPTION OF PREFERRED EMBODIMENT

Figure 1:
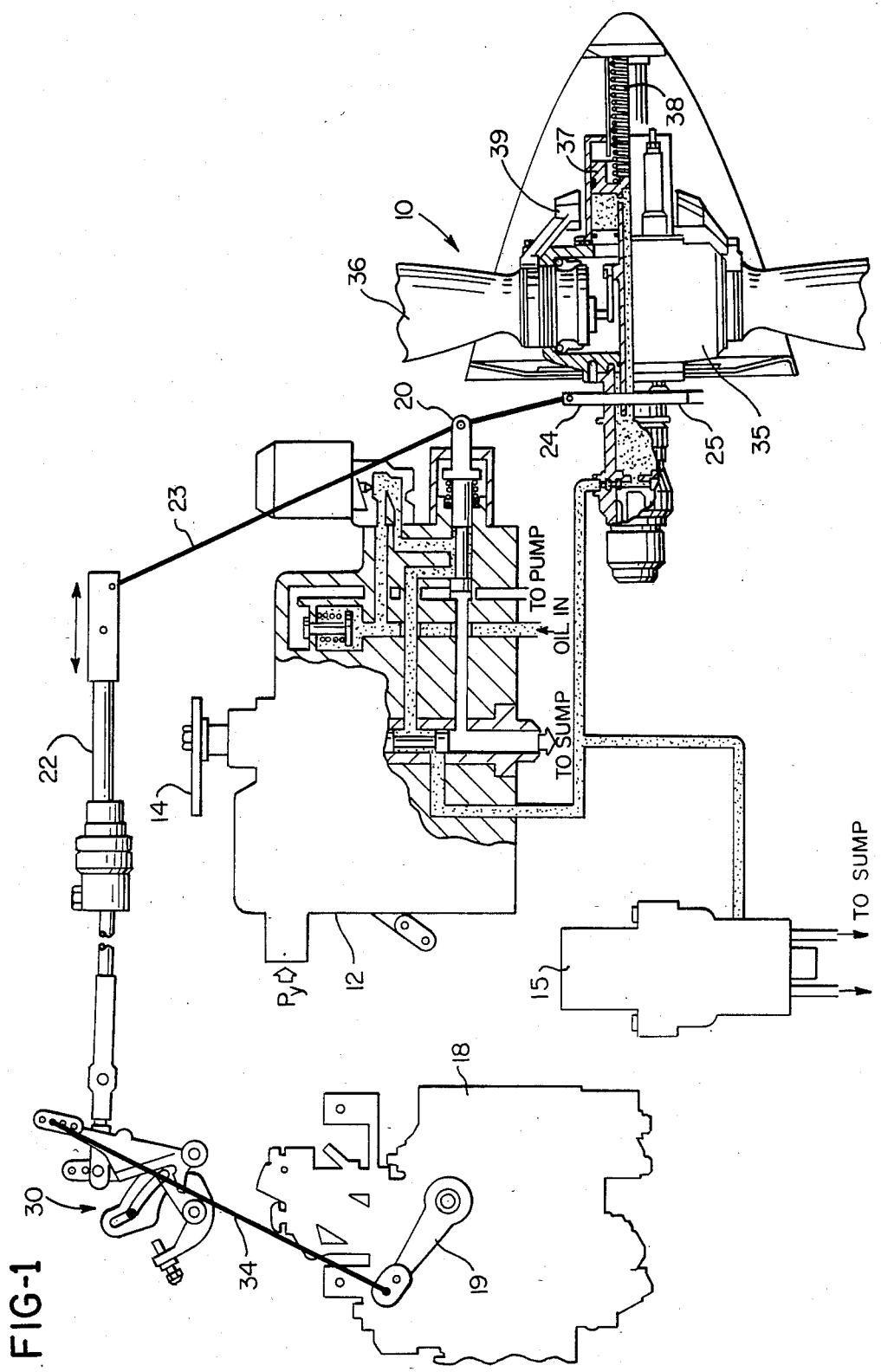
FIG. 1 is a partially schematic system diagram of a control system for a reversing aircraft propeller, according to this invention.

Referring to FIG. 1, a controllable, reversible pitch aircraft propeller according to this invention is illustrated generally at 10. The propeller 10 to which the present invention is applied uses hydraulic pressure to move the blades to a low pitch position, and employs a spring and counterweights to carry the blades to higher pitch positions and to the feathered position.

The propeller 10 is controlled by a hydraulic control system which includes a source of oil under pressure. The oil is applied to the propeller through a governor assembly 12, under normal flight conditions, in accordance with the pitch of a governor speed lever 14. A conventional propeller overspeed governor 15 is connected to dump fluid from the propeller to the sump, to permit the propeller to go to higher pitch settings in the event of overspeed conditions. The fuel governor 18 controls the amount of fuel to a turbine engine, not shown, by means of a fuel control lever 19.

The governor assembly 12 includes a beta valve 20, also connected to apply hydraulic fluid to the propeller 10 through the internal passageways in the governor assembly 12. The beta valve 20 may be initially positioned by a push/pull control rod 22 operating through a floating lever 23. The opposite end of the floating reversing lever 23 is connected to a slider brush or block 24 which runs in a groove in a beta position feedback collar 25 carried on the propeller 10. The pilot's power levers (not shown) are connected to operate the push/pull control rod 22 through a control beta cam box 30.

The propeller 10 has a hub 35 in which a plurality of propeller blades 36 are mounted, typically three or four. The position of the propeller blades is controlled by a fluid motor piston 37 opposed by the spring 38 and conventional counterweights 39. Applying hydraulic fluid to the propeller causes the blades 36 to move to a lower pitch position, and to reverse pitch positions, while the spring 38 and counterweights 39 carry the blades 36 toward the high pitch and to the feather positions.

In most flight operations, the pitch of the propeller blades 36 is controlled by the flyweight governor contained within the governor assembly 12. The governor itself is of conventional construction including the usual flyweights operating against an internal speeder spring. The speeder spring is biased by the speed adjusting lever 14, controlled by the pilot. However, in the beta range, during low and reverse pitch conditions, and when the governor is operating too slowly to be a governing factor, the position of the propeller may be directly controlled by the pilot by movement of the rod 22 through the cam box 30, through the movement of the pilot's power levers. This results in a shifting of the spool of the beta valve 20. Pulling the push/pull control rod 22 to the left, as viewed in FIG. 1, causes an opening movement of the beta valve 20, with concurrent application of hydraulic fluid to the piston 37. This causes the piston to bring the propeller blades to a lower pitch position, accompanied by concurrent movement of the collar 25 and the floating lever 23 forwardly in such a manner as to reclose the beta valve 20. The control beta cam box is also connected to the fuel lever 19 through a push/pull connecting rod 34, to control the turbine fuel governor, so as to limit propeller rpm in the ground and reverse positions, as well as to schedule fuel for high powered forward flight.

Further details of the propeller itself and the servo piston for positioning the blades may be seen in FIG. 2. The piston 37 is slidably mounted in a cylinder dome 40 for movement under the influence of hydraulic pressure against counterweights 39 and against a spring 38. Hydraulic operating fluid is fed through an internal hollow piston tube or rod 45. The movement of the piston 37 is translated to the blades 36 through connecting links 48, one of which is shown in FIG. 2. The links 48 are connected to the blade root ends near the trailing edge of each blade.

The hub of the propeller contains an internal spider or yoke 50 mounted on the tube 45. The yoke 50 has as many radially extending arms 52 as there are propeller blades. Thus, in the case of a four-bladed propeller the yoke 50 will have four individual arms 52, one of which is shown in FIG. 2. Each yoke arm is forked or slotted at its outer extremity so that each partially circles and forms a close fit with one beta feedback rod 55. There is one beta feedback rod 55 for each propeller blade, and each rod is mounted and supported in plain bearings at the front and aft ends of the propeller hub 35, and biased by return springs 56 to a home position 57 as shown in FIGS. 2 and 3. The aft end of each rod 55 is connected to the annular feedback collar 25 which accordingly follows the position of the rods 55. This position is translated through the carbon brush or block 24 to the lever 23, and to the beta valve 20.

In the governor mode, oil is metered to and from the propeller 10 by the governor pilot valve as positioned by the internal fly weights (not shown) for increasing and decreasing the blade angle as required when the propeller speed control setting at the lever 14 is altered or for increasing and decreasing pitch to control and stabilize the propeller speed with varying power conditions or flight with a fixed setting of the lever 14. During this movement, the yoke 50 and the individual arms 52 move in translation along the surfaces of the individual rods 55, without imparting any movement to these rods. A typical flight position of the yoke 50 and blades is illustrated in FIGS. 2 and 3. In lower pitch positions, in which the propeller blades are under beta control, the position of the blades 36 is fed back by the arms 52 of the yoke 50 to the feedback rods 55.

The pilot may select the beta mode operation for ground reversing or taxi operations through the aircraft-engine mechanical linkage which repositions the propeller reversing lever and the beta valve to provide access for high oil pressure to reach the propeller piston and thus to move the blade from a low pitch position to or toward a reverse position. As previously noted, the yoke 50 translates the motion of the internal piston rod 45 to the feedback collar 25 which supports the stationary carbon block 24.

The general configuration and operation of the propeller control system, described above, is similar to that shown and described in the above-identified patents of Biermann and Morris, Jr. However, in these patent disclosures, there is no provision for an expanded range of propeller movement, during beta control, without effecting concurrent movement of the feedback rods. Therefore, once the propeller was under control of the pilot, in the feedback mode, the position of the blades was more or less directly proportional to the position of the beta valve spool. Thus, in order to achieve a further reduction in blade angle from the flight idle position, to achieve a lower blade angle for ground operating conditions, it was necessary to effect mechanically a further movement of the beta valve to achieve such decreased blade angle, over and above that provided to the pilot through the cam box 30 by the movement of the power levers.

This invention includes means providing for a predetermined movement of the blades 36, during beta operation, without incurring a corresponding movement of the feedback mechanism. This function is operative upon the pilot selecting a position in the ground operating range, below flight idle position of the cam box 30, with the pilot's power levers, and automatically decreases the blade angle by a predetermined extent, which may be, for example, between 4° and 10°. For this purpose, the beta feedback rods 55, which have heretofore been provided with a fixed stop to pick up the yoke arms 52, as shown in the previously identified prior art patents, are now provided with movable pickup stops. The movable stops may take the form of sleeves 60, slidably received on rods 55 and normally biased against a shoulder or enlarged diameter portion 55A by first compression springs 62. Each sleeve 60 carries an annular pickup ring 65 which is proportioned to be engaged by the forked end of an arm 52. Each spring 62 is held under compression by a pin 66 or the like carried in a suitable hole through the smaller diameter portion 55B of the rod 55. A snap ring in a groove on the rod could also be used. The conventional rod return coil spring 56 is received over the rod 55 between a recessed portion 70 of the hub and the pin 66.

The sleeves 60 are held by the springs 62 in a normally seated position as shown in FIG. 3 against the shoulders 55A, and are movable on the rods to a moved position by compression of the springs 62. It should be noted that the force required to compress each spring 62 is greater than the force exerted by the return spring 56, so that when the forked end of the arm 52 of the yoke engages the pickup ring 65 on the sleeve 60, the rod 55 will be moved to the left as viewed in FIGS. 3-7. It should also be noted that the sleeves 60 have a defined and limited range of movement with respect to the rods 55, which range is defined by the space or gap 71 between the ends of the sleeve and the pin 66.

The invention further includes adjustable and movable rod stop members 75, one for each rod 55. The stop members 75 are positioned to interrupt temporarily the movement of the feedback rods 55. In the embodiment of FIGS. 3-7, the stop 75 is contained in a tubular housing 79 which has an inner end received over and fixed to an annular boss 81 formed on the hub, in generally coaxial relation with the rod 55.

Each movable stop member includes an internal plunger-shaped stop 78 which is spring-biased by a spring 80 to a normally seated position, as shown in FIG. 3, the exact position of which is defined by a nut 82 threaded on an exposed end 83 of the stop. An exposed threaded end 84 of the rod 55 extends through the hub and into the interior of the housing 79, and carries a threaded adjusting nut 85 on the end thereof, to define the normal seated position of the beta feedback rod 55. It should be noted here that the force required to compress the stop spring 80 is greater than the force required to compress the spring 62 of the sleeve 60 and is also, therefore, greater than that required to compress the spring 66.

FIGS. 3 through 7 constitute sequential views, and illustrate the operation of this invention in the beta or direct feedback mode, when the propeller is under control of the beta valve 20.

Figure 4:
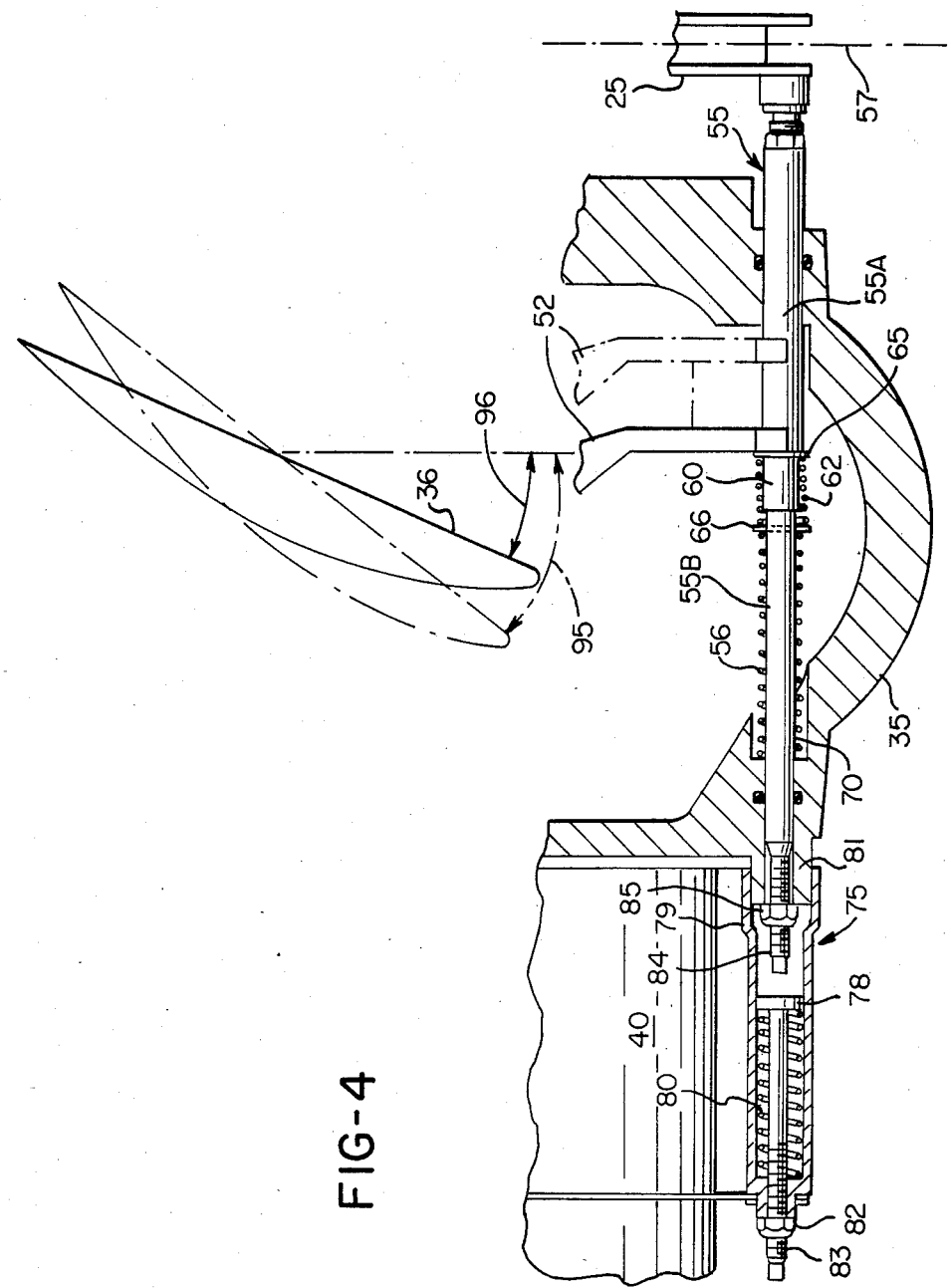

FIG. 4 shows the movement of the yoke arm 52 from the phantom position where it was under control of the governor to a full line position where the arms 52, at their extremities, have just picked up the beta rods at a blade angle somewhat slightly higher than the flight idle angle setting. The beta rods and collar 25 are shown in the home position as represented by the datum line 57. For example, the angle 95, illustrating a typical flight condition, may be 35°, while an angle 96 may be 18½°. At this point, there has been no movement of the beta feedback rods 55 or the collar 25.

Figure 5:
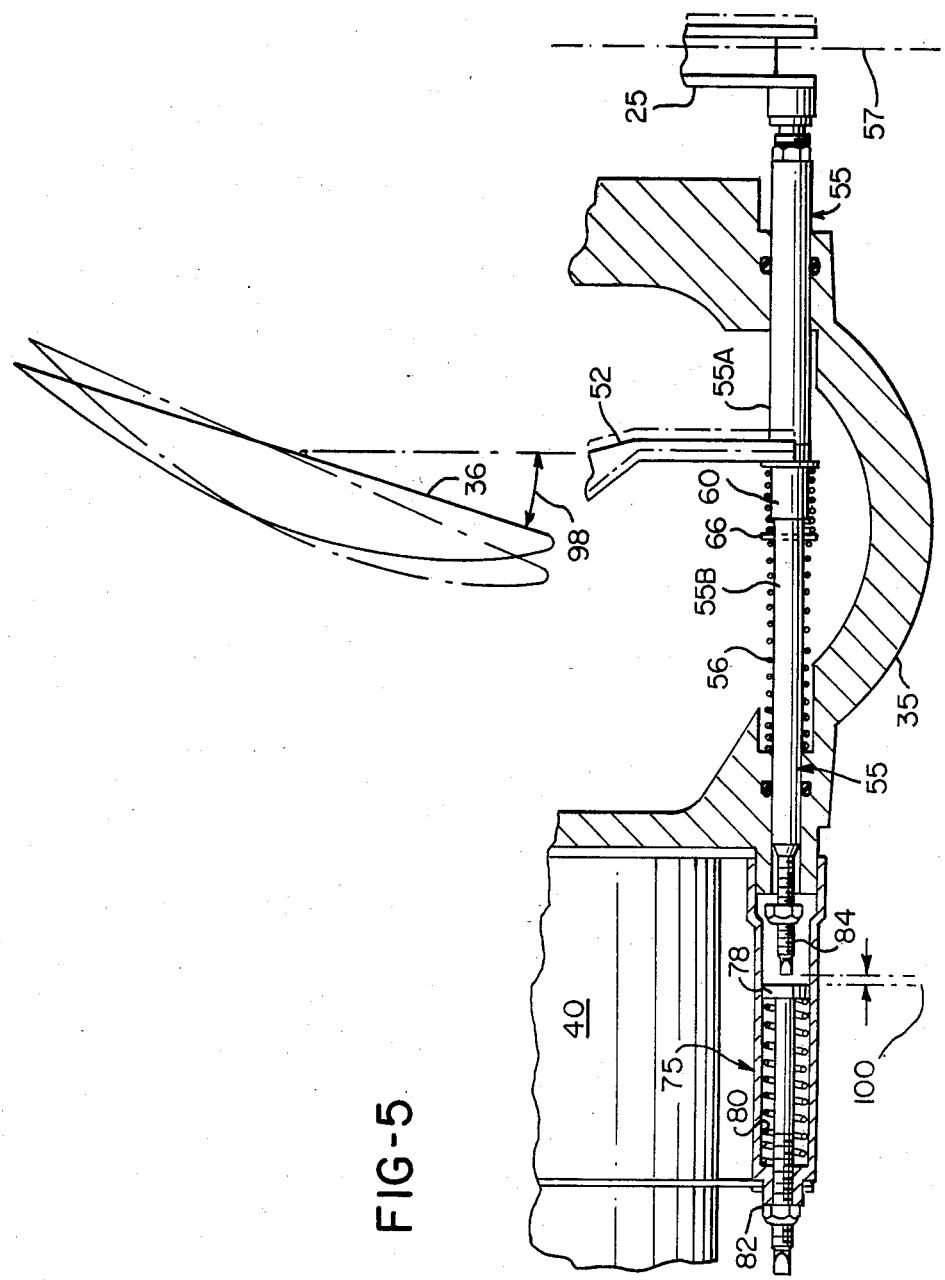

The next sequential view, FIG. 5, shows how the continued movement of the arm 52 picks up and moves a beta rod 55 to a predetermined flight idle range which may be some 4½° less than the angle 96 of FIG. 4, for example 14°, as represented by the angle 98. When the bifurcated end of the arm 52 contacts the annular pickup ring 65 of the sleeve 60, the rod 55 is first moved to the left. At this point, a small gap 100 is formed between the threaded adjustable end 84 of the rod 55 and the stop 78.

Figure 6:
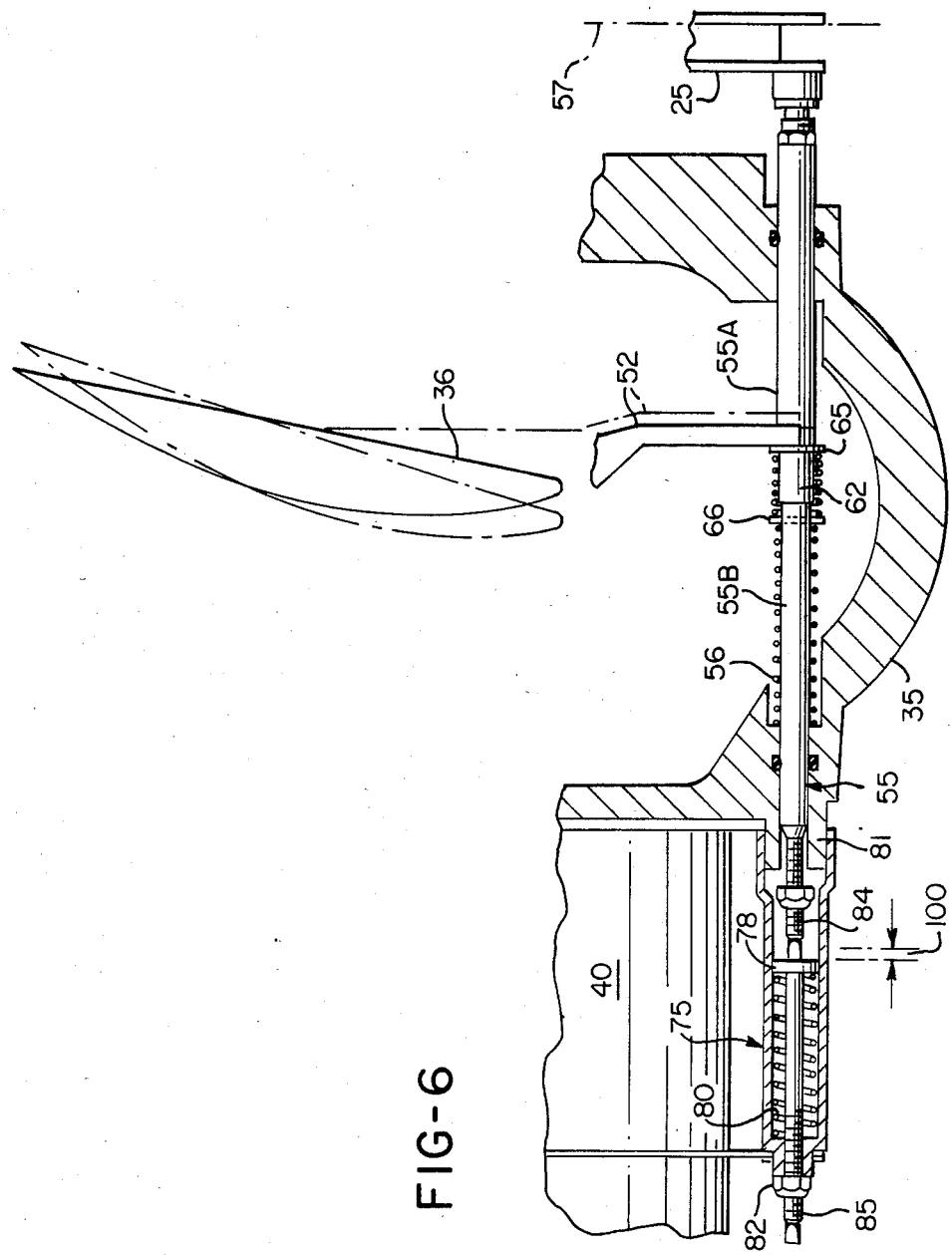
Figure 7:
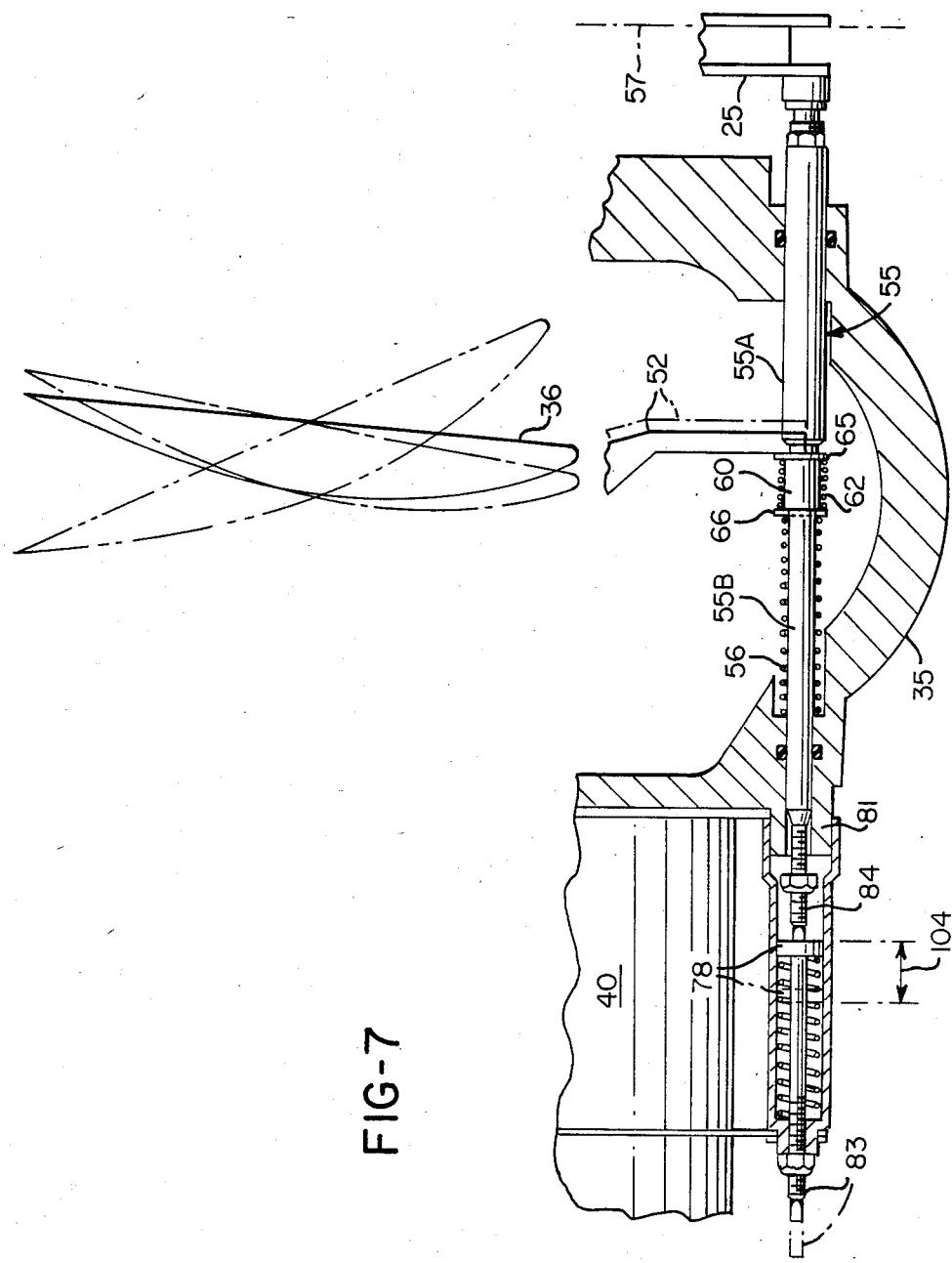
Figure 8:
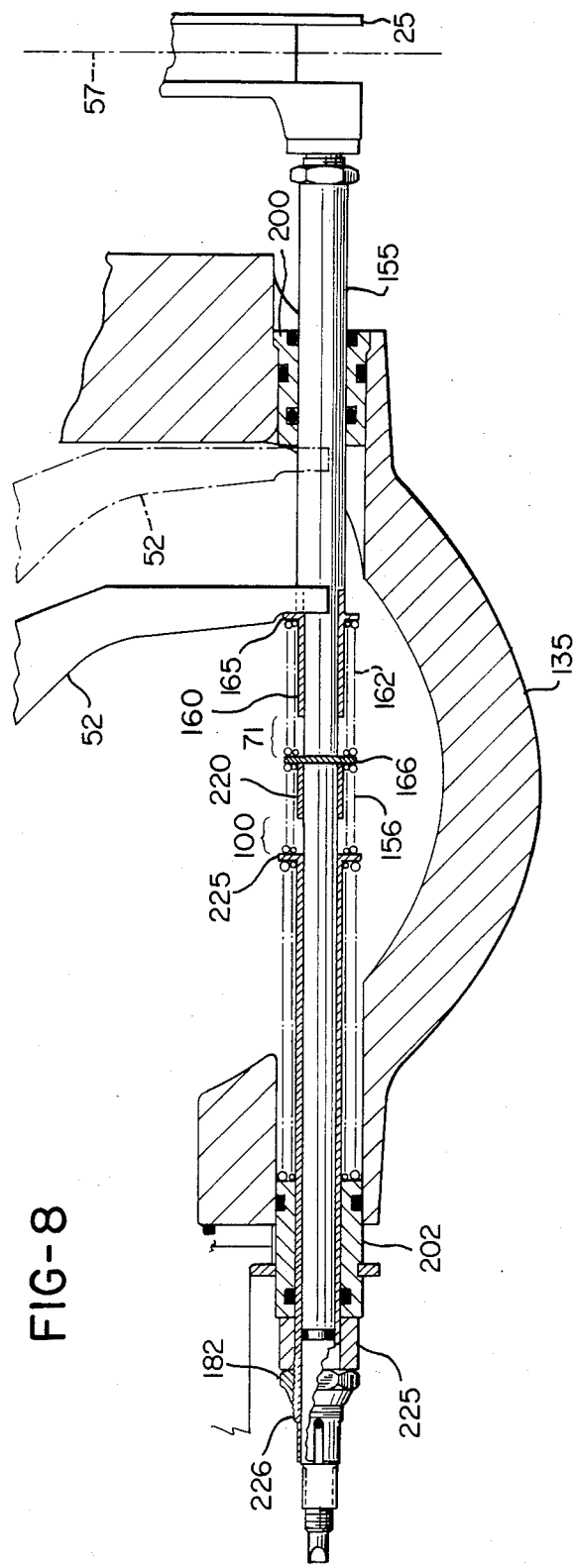
FIGS. 8 through 12 are enlarged fragmentary sections through the propeller hub, similar to FIGS. 3 through 7, showing another embodiment of the invention, in which the moving stop members are located entirely within the propeller hub.

FIGS. 6 and 7 depict the position of the parts when the pilot selects a ground idle position, such as following the landing roll and during taxing operations. The initial movement of the power levers through the cam box 30 causes a slight movement of the push/pull rod 22 and the lever 23 to open the beta valve 20. The blades 36 now move to the full line position as shown in FIG. 6. This movement may be only about 2°, but sufficient to close the gap 100 and to bring the ends 84 of the rods 55 into contact with their respective stops 78. However, this movement is not enough to reclose the beta valve, and the piston 37 continues to move to the left under the influence of hydraulic pressure through the valve 20. Since the rods 55 have come into contact with stops 78, and since the sleeve springs 62 have a lower compressive force than the stop springs 80, the yoke 50 and associated arms 52 continue to move by causing the sleeves 60 to move relative to the rods 55 by compressing the springs 62. This condition is illustrated in FIG. 7. The total movement as permitted by the sleeves 60 is through the gap 71 and permits the blades to move to a ground idle position through some additional 6°. When the sleeves 60 have moved into contact with their respective stops 66, the feedback rods 55 are again picked up and moved with the arms 52 now accompanied by movement of the stops 78 against the springs 80. The beta valve is now closed, and the blades have been shifted a substantial distance to a very low blade angle. In bringing the blades to a higher pitch position the sequence is reversed.

FIG. 7 further illustrates the position of the parts in the event reverse pitch is called for by the pilot. The rods 55 are caused to move through a further distance 104 indicated by the displaced movement of the stops 78.

The arrangement of a movable stop means in the form of sleeves on the rods 55, which may move through a finite distance only after the beta rods 55 have come into engagement with the stop 78, provides for the continued movement of the propeller blades 36 automatically to a lower blade angle, to assure a ground operating condition whicn has low thrust and permits sufficiently high rpm, as previously noted.

The gap 100 as well as the home position of the stop 78 are selected so as to assure that the automatic shift to a lower pitch range does not occur at the flight idle angle position, but only occurs after the power levers have been moved into the ground idle range. Thus, when a ground idle position of the power levers is selected, the beta valve is again opened slightly and the initial movement of the blades into engagement with the sleeves causes the sleeves to bring the beta rods 55 through the distance represented by the space 100, thus temporarily arresting the movement of the beta rods accompanied by sliding movement of the sleeves 60 on the rods 55 until the same have come into engagement with the pins 66, at which time the rods 55 are again picked up and permitted to move with the blades until the beta valve is reclosed. The movement available to the pilot, by moving the power levers from the flight idle position into the ground idle range, is accompanied by a substantially larger and smooth transitional movement of the blades from a rather substantial flight idle angle to a very low blade angle for ground idle operation.

In summary, the sleeves 60 define movable stop means or lost motion connections coupling the yoke 50 to the beta feedback rods 55 and collar 25. This movable stop means comes into operation only during movement of the power lever from the flight idle to ground idle position, and permits the blades 36 to move to a lower blade angle by providing for a range of movement of the blades in which the beta rods are not moved. The entire beta shift mechanism is integral with the propeller blade change mechanism and does not require any external solenoid or other device for the purpose of shifting the beta valve, to achieve a low blade pitch angle for ground idle positions.

An alternative preferred embodiment of the invention is illustrated in FIGS. 8 through 12, in which like parts have been labeled with like reference numerals from the preceding embodiment, plus 100. The embodiment of FIGS. 8 through 12 differ primarily from the preceding embodiment in that the movable stop 78, formerly positioned externally of the hub, in this preferred embodiment, positioned internally of the hub in the form of a spring biased collar arrangement formed concentric to and slidably mounted on the beta feedback rods themselves. The hub 135 is shown as slidably mounting one of the beta feedback rods 155 on inset bushings 200 and 202. The identical blade yoke 50 and pick-up arms 52 are employed as in the preceding embodiment.

The movable sleeves 160, similar to the sleeve 60, are slidably mounted on the rods 155 and are similarly formed with a collar or shoulder 165 for engaging the forked ends of one of the arms 52. In this embodiment, the sleeve 160 operates in the same manner as that previously described in connection with the sleeve 60, and is normally biased into its seated position by a spring 162. Instead of the pin 66, a snap-ring 166 is received in a groove 167 on the rod 155, and forms a seat for the spring 162. The ring 66 also forms a seat, on its opposite side, for a second sliding collar 220. A second sliding collar 220 is biased to its seated position by a spring set 156 corresponding to spring 56. There are no parts in the preceding embodiment which correspond directly to the second sleeve 220, except to note that the second sleeve 220 operates to define the gap 100. This gap is now established between the inner end of the sleeve 220 and the flanged end 225 of a movable tubular stop 178 corresponding in function to the stop 78 of the preceding embodiment. In this instance, the movable stop 178 is formed as a sleeve in telescopic relation to the rod 155 and extending inwardly into the interior of the hub 135 through the bushing 202. The position of the annular head or flange 225 of the sleeve 178 may be set by the nut 182 on the exposed threaded end 226. A compression spring 180, corresponding generally to the spring 80, maintains the stop member 178 in a seated position with the nut 182 resting on an external spacer sleeve 225.

Figure 9:
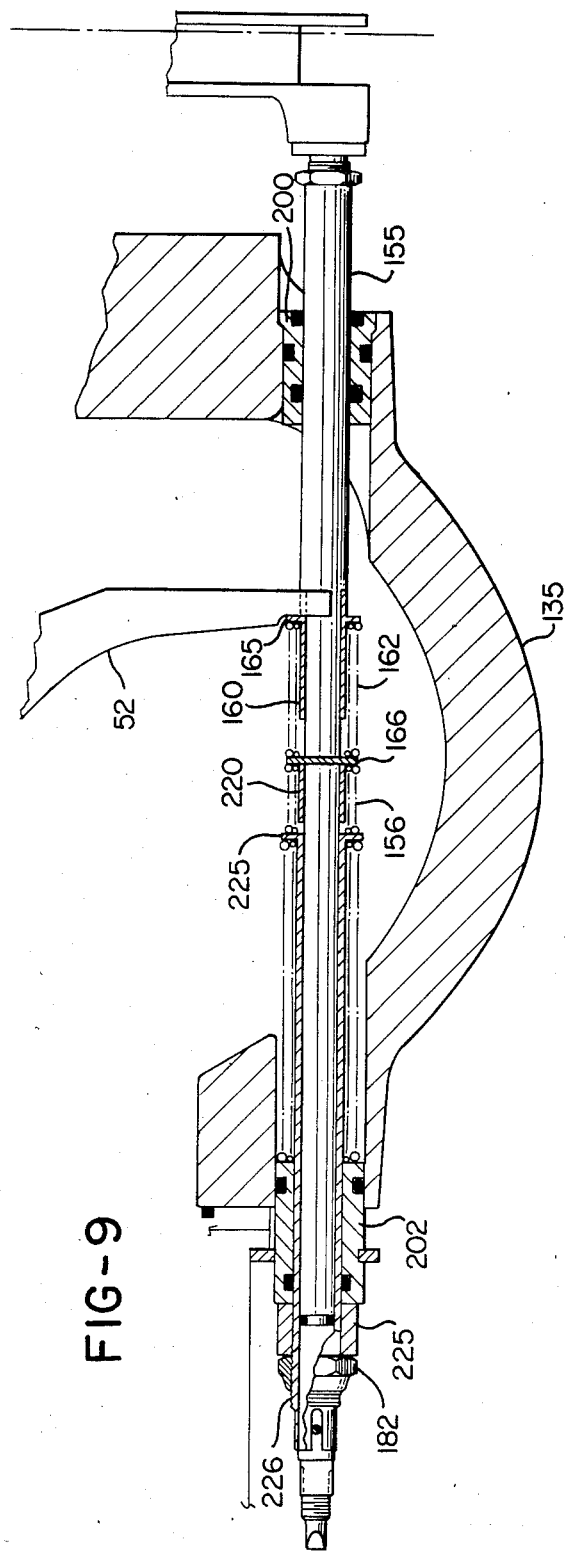
Figure 10:
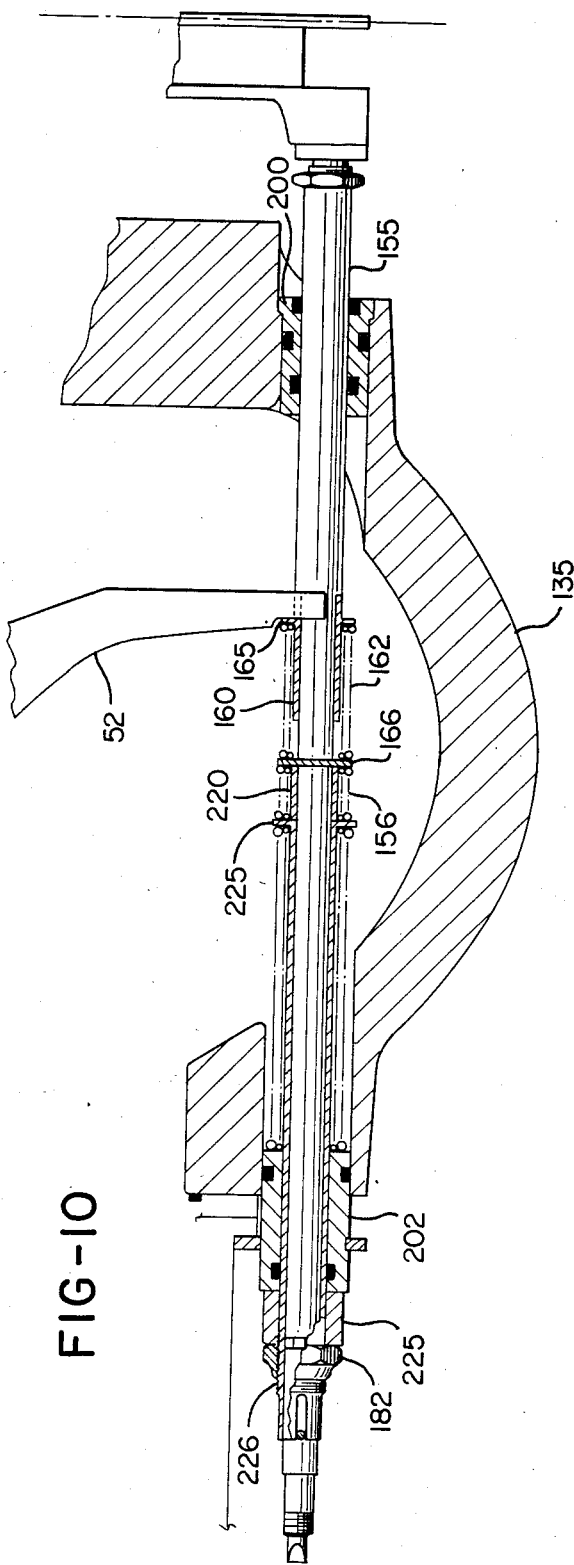
Figure 11:
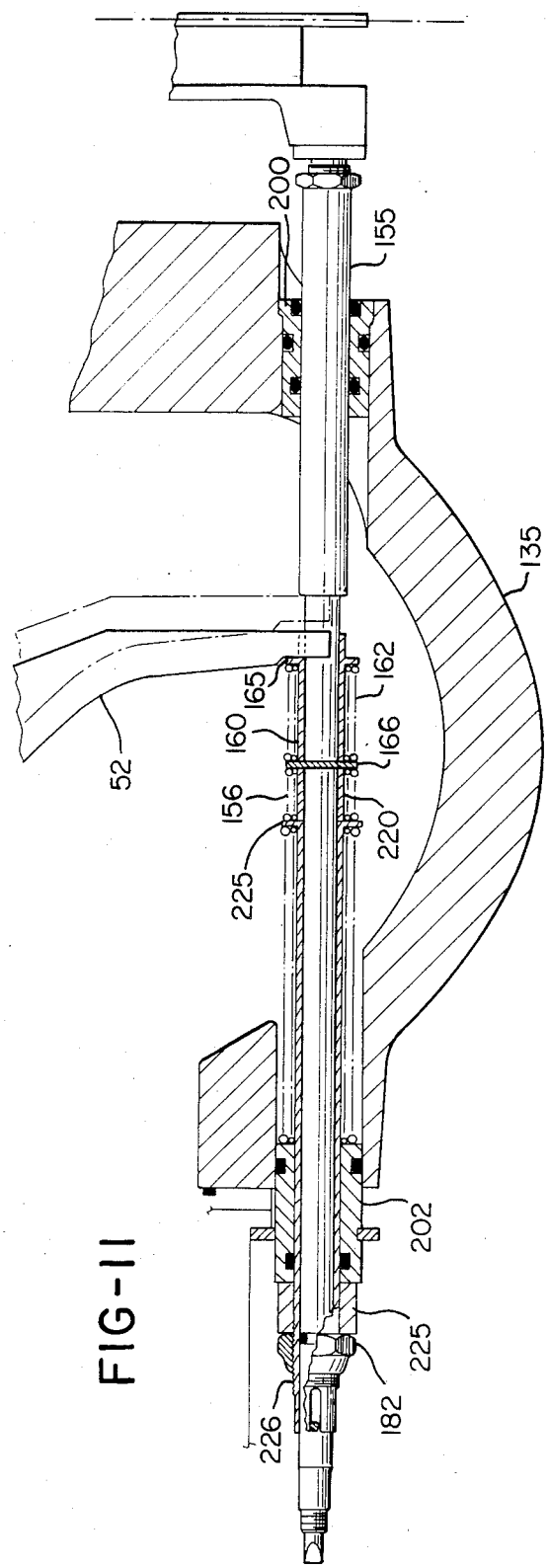

The sequence of operation can best be understood by referrring to the respective FIGS. 9 through 12. In FIG. 9, the arm 52 has caused the beta rod to move to the left from its home position to and take up most of the gap 100, followed by compression of the beta rod return springs 156. In FIG. 10, the sleeve 220 has now seated on the head 225, corresponding to the position of the parts of the first embodiment as shown in FIG. 6 where the end 84 had engaged the head 78. Continued movement of the arms 52 is now accompanied by sliding movement of the sleeve 165 on the rod 155 by compressing the spring 162. This condition is shown in FIG. 11 and results in the blades being shifted to a lower pitch position in the same manner as previously described in connection with the movement of the sleeve 60 from its seated to its moved position with the compression of the spring 62.

Figure 12:
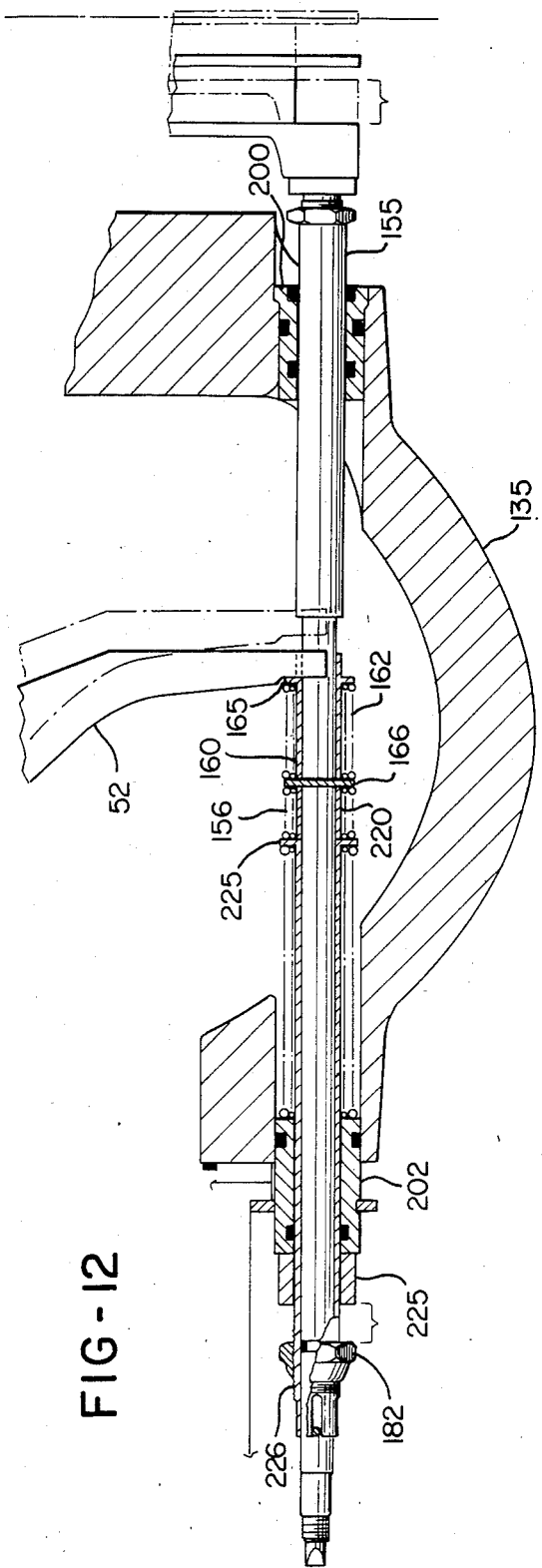

Continued movement now picks up the beta rod since there are no further gaps between either the sleeve 160 or the sleeve 222 and the head 225 of the movable stop 178. Actually, this movement is picked up by the end of the sleeve 160 contacting the snap ring 166. Such movement continues to a point where the beta valve is mechanically reclosed, as illustrated in FIG. 12 where the nut 182 has been lifted off of the spacer 225 and is moved through a distance 204 corresponding to the distance 104 of the preceding embodiment. It will be noted that the beta rod return springs 156 require the least force to compress, followed by the springs 162, with the spring set 180 requiring the greatest force to compress, to set up the required sequence of operation.

One of the principal advantages of the embodiment of the invention is illustrated in FIGS. 8 through 12 is the fact that the moving stop mechanism is now containted entirely within the interior of the propeller hub where it is physically protected as well as lubricated.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a variable pitch hydraulic aircraft propeller in which at least a portion of the propeller pitch range is controlled directly by the pilot by manipulating a fluid control valve, and in which a blade yoke in a propeller hub is positioned by the blades to move a feedback mechanism including a beta feedback rod for repositioning the fluid control valve in accordance with the position of the blades, the improvement for effecting a blade shift into a low pitch position through an angle which exceeds that available to the pilot by selecting a ground idle range, comprising means on said feedback rod forming a movable stop, means on said movable stop engageable by said blade yoke, said movable stop being movable between a normally seated position and a moved position, spring means biasing said stop into said normally seated position, said stop being positioned on said rod so as to be engaged by said yoke upon the selection of a ground idle position by the pilot and movable against said spring means to said moved position by movement of said blades under the control of said valve without accompanying movement of said feedback rod providing for a shifting of said blades to a lower pitch position and thereafter providing for the reclosing of said fluid control valve following the interruption of said movement of said feedback rod.

2. In a reversible pitch hydraulic aircraft propeller having a plurality of blades on a hub and in which relatively low pitch and reverse pitch positions of the blades are in control of a beta valve, including a corresponding plurality of feedback rods, and yoke means in said hub movable in response to the movement of the propeller blades, for translating the position of the propeller blades to the feedback rods for reclosing the beta valve, the improvement comprising:

movable lost motion means on each of said rods having a portion engageable by said yoke at a predetermined low position, said lost motion means including sleeves slidably received on said rods and movable between normally seated positions and moved positions, first spring means on said rods normally biasing said sleeves to said seated positions, rod spring means on said rods urging said rods to a high pitch position, and stop means positioned to engage said rods, stop spring means urging said stop means in a seated position with a force which exceeds the force of said first spring means on said sleeves for temporarily preventing movement thereof while said yoke means moves said sleeves against the force of said first spring means to the moved position thereof and thereafter permitting movement of said rods by compression of said stop spring means to provide for a controlled degree of shifting of said blades to a lower pitch position unaccompanied by movement of said feedback rods during movement of said sleeves from said seated to said moved positions.

3. A reversible pitch hydraulic aricraft propeller having a hub and a plurality of blades extending therefrom adapted for use with turbine engines, in which the pitch angle of the propeller blades under relatively low pitch positions and reverse pitch positions is under the control of a beta valve, and in which the propeller includes a mechanical feedback arrangement in the form of at least one feedback rod-like member for translating the position of the propeller blades to the beta valve, the improvement comprising:

a lost motion connection in said hub coupling said one feedback member to said beta valve, spring means normally urging said lost motion connection to a first position and movable against said spring means to a second position, and stop means on said hub temporarily interupting the movement of said feedback member upon the attainment of the blades at a predetermined low pitch angle positon to permit the blades to continue to move to a lower pitch angle position under the influence of hydraulic pressure from said beta valve by movement of said lost motion connection from said first to said second position, and thereafter at said second position reestablishing the movement of said member corresponding to pitch positions lower than said predetermined low position including reverse pitch positions.

4. The propeller of claim 3 in which said lost motion connection includes a sleeve slidably received on said one rod-like member for movement between said positions and a blade yoke movable by said blades and positioned to engage said sleeve for moving said rod-like member through said sleeve.

5. In a reversible pitch aircraft propeller in which the low pitch and the reverse pitch positions are controlled by the pilot through a beta valve, the improvement for permitting the propeller blade to move automatically to a lower pitch position upon the selection by the pilot of a particular low pitch setting of the beta valve, comprising:

a propeller hub, a plurality of propeller blades rotatably mounted in said hub, a control piston having an inwardly extending tube in said hub, a yoke mounted on said tube, means coupling said yoke to said blades, a plurality of beta feedback rods, one for each of said blades, slidably mounted in said hub and connected in common to an external beta feedback collar, means connecting said collar to said beta valve, said yoke having a plurality of arms, one for each of said rods, and at least partially encircling the associated said rod and the remote ends of said arms, sleeve means on each of said rods engageable by the associated one of said yoke arms at a given low pitch setting of said beta valve, each of said sleeve means being movable on its associated said rod between a normally seated position and a moved position, first spring means urging said sleeve means into their seated positions, a plurality of movable stops, one for each of said feedback rods, each of said movable stops being positioned to engage the associated said rod at a pitch position of said blades somewhat lower than the position represented by the engagement of said arms with said sleeve means and adapted to be moved through a predetermined distance to a moved position, the force of said first spring means on said sleeve means being less than that of said second spring means on said stop means, whereby engagement of said sleeve means by said arms during lower pitch settings of the beta valve will cause said beta rods to move until said stop means is engaged by said rods, followed by movement of said sleeve means from said seated to said moved positions without accompanying movement of said rods, thereafter followed by renewed rod movement against said movable stop means until said beta valve is reclosed.

6. In a variable pitch aircraft propeller for use with gas turbine engines including a propeller hub containing the pitch change mechanism and supporting a plurality of propeller blades, in which the position of the propeller blades at relatively low pitch angles is determined by the position of a beta valve, and in which a mechanical feedback lever mechanism is connected to transmit the position of the blades to the beta valve at such low pitch angles to effect a closure of the beta valve when a predetermined low pitch angle is achieved corresponding to the setting of said valve, the improvement providing for an additional movement of the blades through a predetermined angle to a lower pitch angle in a ground idle condition of the turbine engines, comprising:

a lost motion connection in said hub having means movable between first and second positions, spring means normally biasing said connection in said first position and said connection being movable against said spring means to said second position, said connection having means engageable by said blades and having a connection with said lever mechanism and providing for limited movement of said blades into a lower pitch position without concurrent movement of said lever mechanism as said connection moves from said first to said second position, and thereafter in said second position transmitting movement of said blades to said lever mechanism to close said valve.

7. The propeller of claim 6 further comprisng a spring-biased stop on said hub normally held in a seated position, and positioned to engage said lever mechanism at a predetermined low blade angle, and second spring means biasing said stop into said seated position with a force with exceeds that of said lost motion connection spring means for temporarily interrupting movement of said lever mechanism while said connection moves from said first position to said second position.

* * * * *